United States Patent [19]

Inaba et al.

[11] Patent Number: 5,244,693
[45] Date of Patent: Sep. 14, 1993

[54] PROCESS FOR THE PREPARATION OF A NETWORK ARTICLE

[75] Inventors: Shin-ichi Inaba; Yasuyuki Shindo; Shirou Tsubouchi, all of Gunma; Hiroki Naganuma, Urawa; Yoshio Nakazawa, Musashino; Ryusuke Hayashi, Yokohama; Kanji Yamada, Tokyo, all of Japan

[73] Assignees: Kanebo Ltd., Tokyo, Japan; Nippon Steel Corporation, Tokyo, Japan

[21] Appl. No.: 846,517

[22] Filed: Mar. 4, 1992

Related U.S. Application Data

[62] Division of Ser. No. 490,400, Mar. 8, 1990, Pat. No. 5,110,656.

[30] Foreign Application Priority Data

Mar. 15, 1989 [JP] Japan .................................. 1-60738
Mar. 15, 1989 [JP] Japan .................................. 1-60739
Mar. 15, 1989 [JP] Japan .................................. 1-60740
Mar. 15, 1989 [JP] Japan .................................. 1-60741

[51] Int. Cl.⁵ .......................... D06C 3/00; B05D 3/12
[52] U.S. Cl. ..................................... 427/173; 427/176
[58] Field of Search ............................... 427/173, 176

[56] References Cited

U.S. PATENT DOCUMENTS 4,581,275 4/1986 Sudo et al. ......................... 428/113
4,910,076 3/1990 Ando et al. ........................ 428/245

Primary Examiner—Marianne Padgett
Attorney, Agent, or Firm—Kane, Dalsimer, Sullivan, Kurucz, Levy, Eisele and Richard

[57] ABSTRACT

A process is disclosed for the preparation of a network article of a leno cloth fixed with a resin. The leno cloth is impregnated with the resin and the resin is solidified while tension is applied in the direction of the weft of the cloth.

8 Claims, 4 Drawing Sheets

PROCESS FOR THE PREPARATION OF A NETWORK ARTICLE

This is a divisional of copending application Ser. No. 07/490,400 filed on Mar. 8, 1990, now U.S. Pat. No. 5,110,656.

FIELD OF THE INVENTION

This invention relates to a network article comprising reinforcing fiber, particularly a network article which more effectively exhibits properties of reinforcing fiber such as tensile strength and elastic modulus, when used in structures of construction such as fiber-reinforced inorganic plates, e.g. those used in roofs, walls, floors and pits, pillars and blocks, or in FRP. The invention relates also to a process for the preparation of the above network article, and a shaped inorganic article reinforced with the network article.

BACKGROUND OF THE INVENTION

A wide variety of fiber-reinforced inorganic plates were proposed. There are known fiber-reinforced inorganic plates in which short fibers are randomly arranged as a reinforcing material, and those in which continuous fibers are oriented in one or two directions and layered (Annual Reports No. 29, p 81–88 and No. 30, p 57–68 issued from the Technical Research Laboratories, Kajima Corporation; and Japanese Patent Kokai Sho-59-138647.)

In fiber-reinforced inorganic plates, it is impossible to obtain a reinforcing effect corresponding to the strength of a reinforcing material unless adhesive strength between fibers as the reinforcing material and an inorganic material as a binding material is sufficient. This problem is particularly serious in a case where high strength reinforcing materials or fiber bundles are used. That is, when carbon fiber with a low strength such as 80 Kg f/mm$^2$ is used in a form of short fiber monofilaments, it exhibits a reinforcing effect until broken by added tensile stress because the surface area of the fiber is large compared to its strength. Meanwhile, when fiber or fiber bundles with high strength are used, the fiber slips, so that a reinforcing effect corresponding to the intrinsic strength of the reinforcing fiber is not attained.

In order to overcome the above problem, it was proposed that continuous high-strength fiber is woven into a leno cloth in which nodes are strongly bound, and impregnated with a resin, which is then cured to obtain a network article and is embedded in cement mortar (Japanese Patent Kokai Sho-63-111045 and Sho-63-22636). However the best use is not yet made of the intrinsic tensile properties of the fibers of the cloth, such as tensile strength and elastic modulus in the above product.

BRIEF DESCRIPTION OF THE INVENTION

A purpose of the present invention is to provide a network article in which the drawback of the prior art leno cloth article is removed and the intrinsic tensile properties of the cloth fiber are more effectively exhibited, and a process for the preparation thereof.

Another purpose of the present invention is to provide a fiber-reinforced inorganic article in which the drawback of a shaped cement mortar article reinforced with the prior art leno cloth is removed and the intrinsic tensile properties of the cloth fiber are more effectively exhibited.

The present inventors have now found that the above purposes can be attained by the use of a special leno cloth as described below.

The invention is a network article comprising a leno cloth fixed with a resin, characterized in that a weft bending index, $C_f$, as defined below is less than 0.03:

$$C_f = D_f / L_f$$

wherein
- $L_f$ is an average distance between two mutually-adjacent warp yarns, and
- $D_f$ is an average distance between one peak of a wavy central line of a weft yarn and a straight line connecting two peaks adjacent to said peak in a cross section along the weft of the network article.

Another aspect of the invention is a process for the preparation of a network article comprising a leno cloth fixed with a resin, characterized in that a leno cloth is impregnated with a resin and then the resin is solidified while tension is applied in the direction of the weft of the cloth, said tension being so strong that a weft bending index, $C_f$, as defined above is less than 0.03.

Another aspect of the invention is a fiber-reinforced shaped inorganic article comprising a network article composed of a leno cloth fixed with a resin as a reinforcing material, and an inorganic hardening material as a matrix, characterized in that the warp of the network article consists of at least two kinds of yarns having different rigidities, at least one kind of yarn having the highest rigidity out of said warp yarns has a warp bending index, $C_w$, of less than 0.08, as defined below:

$$C_w = D_w / L_w$$

wherein
- $L_w$ is an average distance between two mutually-adjacent weft yarns, and
- $D_w$ is an average distance between one peak of a wavy central line of the warp yarn and a straight line connecting two peaks adjacent to the aforesaid peak in a surface view of the network article, and
- a weft bending index, $C_f$, as defined below is less than 0.03:

$$C_f = D_f / L_f$$

wherein
- $L_f$ is an average distance between two mutually-adjacent warp yarns, and
- $D_f$ is an average distance between one peak of a wavy central line of a weft yarn and a straight line connecting two peaks adjacent to the aforesaid peak in a cross section along the weft of the network article.

DETAILED DESCRIPTION OF THE INVENTION

In a preferred embodiment of the network article according to the invention, yarns having the highest rigidity among the warp yarns scarcely bend and are almost straight in the leno cloth as the weft yarns are, and yarns having lower rigidity among the warp yarns interlace with the weft yarns to bind intersections of the warp and the weft. Thus, in such a preferred embodiment, the warp of the network article consists of at least two kinds of yarns having different rigidities and at least one kind of yarn having the highest rigidity out of the aforesaid warp yarns has a warp bending index, $C_w$, of less than 0.08, as defined below:

$$C_w = D_w / L_w$$

wherein $L_w$ is an average distance between two mutually-adjacent weft yarns, and $D_w$ is an average distance between one peak of a wavy central line of the warp yarn and a straight line connecting two peaks adjacent to the aforesaid peak in a surface view of the network article.

In the following, leno cloths of the prior art will be first explained before the present invention is described in detail.

Figure 2A:
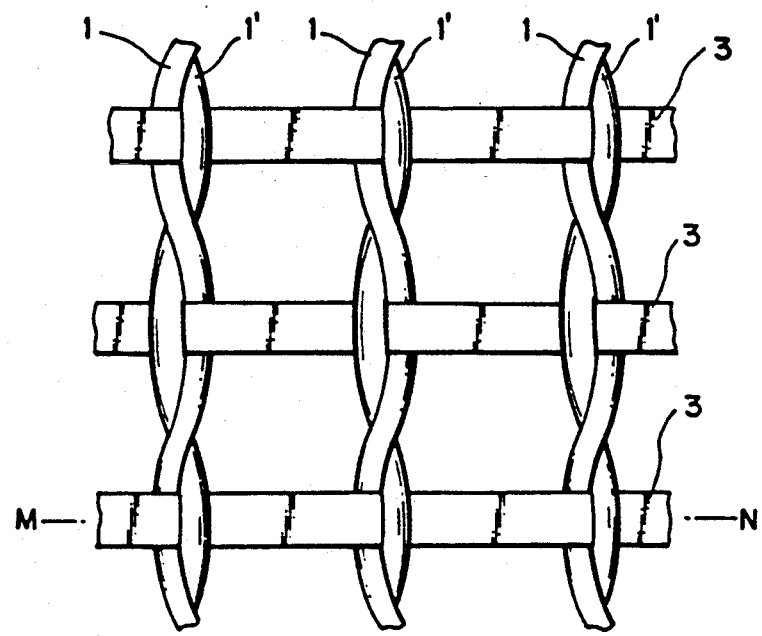
FIGS. 2(a) and 2(b) are a surface view and a cross-sectional view of a leno cloth of the prior art, respectively.
Figure 2B:
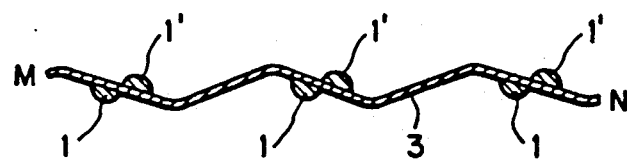

As shown in FIG. 2(a) which illustrates the woven structure of prior art leno cloths, sets of warp yarns 1 and 1' are entangled with each other and bent. Weft yarns 3 accept stress from warp yarns 1 and 1', and bend as well, as shown in FIG. 2(b). Network articles previously used in cement mortar are obtained by fixing such leno cloths with resins. When such a shaped article is subjected to a load, the fibers do not become straight because they are fixed with a resin. As the load increases, localized strain and concentrated stress may take place at the bending positions, so that rupture occurs there before the intrinsic strength of the fibers are fully exhibited. This has now been found by the present inventors.

In a case where a network article is prepared from a leno cloth in a continuous process in particular, a leno cloth is impregnated with a resin solution using a prepreg machine, followed by drying and curing. In such a process, tension is applied to the cloth in the longitudinal direction and, therefore, the weft accepts a force from the warp, bend significantly and fixed as such with the resin. It has now been found that the above progress is a reason why strength of a network article decreases, particularly, in the lateral direction.

Figure 1A:
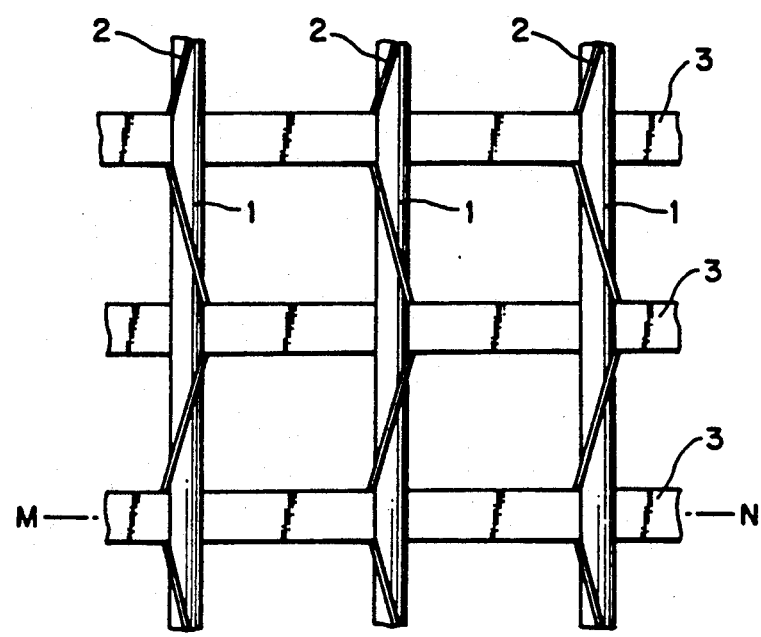
FIGS. 1(a) and 1(b) are a surface view and a cross-sectional view of a network article according to the invention, respectively.
Figure 1B:
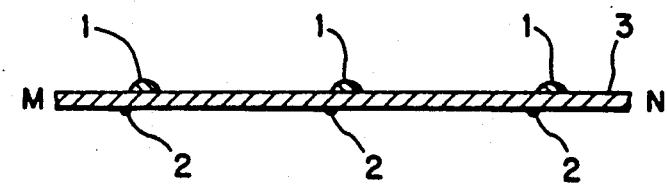

A network article according to the invention is illustrated in FIGS. 1(a) and 1(b), where the warp consists of two kind of yarns. In the network article with decreased curvature according to the invention, a set of warp yarns 1 and 2 consist of yarn 1 having higher rigidity and yarn 2 having lower rigidity. Higher rigidity yarn 1 does not wreathe, but lower rigidity yarn 2 wreathes with yarn 1 to avoid bending the higher rigidity yarn and to keep it straight. Thus, higher rigidity yarn 1 is almost straight and exists substantially on one side of the woven structure. Meanwhile, weft yarn 3 is given almost no bending force from warp yarns 1 and 2 and, therefore, substantially straight as well, as shown in FIG. 1(b).

The warp and weft bending indices $C_w$ and $C_f$ as defined above according to the invention represent a degree how much the warp and weft are bent, respectively. These will further be explained below with reference to FIGS. 3(a) and 3(b), where curvature of yarns is exaggerated for clarity.

Figure 3A:
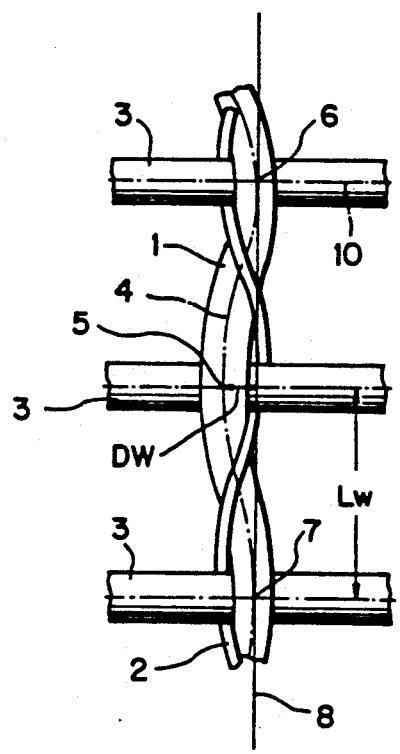
FIGS. 3(a) and 3(b) are illustrations how to determine the warp bending index and the weft bending index, respectively.

FIG. 3(a) is supposed to be an enlarged photograph of a horizontally-positioned network article, which photo is taken in the vertical direction. First, a central line 4 of a high rigidity warp yarn 1 and central lines 10 of weft yarns 3 are depicted. Peaks of the wavy central line 4 usually correspond to the points of intersection of central line 4 with central lines 10. In such a case, $D_w$ is determined by measuring the distance between an intersection point 5 of line 4 with line 10 and straight line 8 connecting points of intersection 6 and 7 adjacent to point 5. Then, the distance between mutually-adjacent weft yarns, $L_w$, is measured. $D_w$ is divided by $L_w$, yielding a warp bending index, $C_w$.

Figure 3B:
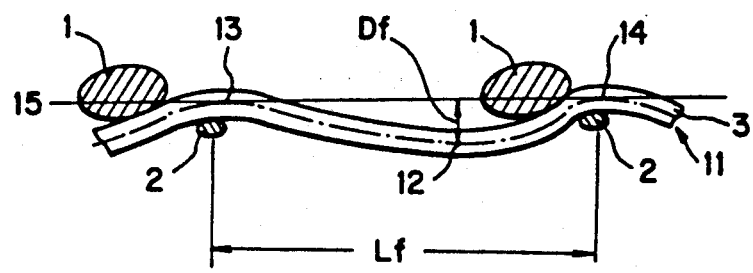

Next, FIG. 3(b) is supposed to be an enlarged photograph of a cross section along the weft direction of a network article fixed with a resin, where the cross section faces in a upward vertical direction and the photo is taken in the vertical direction. Central line 11 of weft yarn 3 is depicted. The distance between a peak 12 of central line 11 and straight line 15 connecting peaks 13 and 14 adjacent to peak 12, $D_f$, is measured and divided by the distance between the warp yarns, $L_f$, to yield a warp bending index, $C_f$. The distance between the warp yarns, $L_f$, is the same for both higher rigidity yarns 1 and lower rigidity yarns 2. In the invention, $C_w$ and $C_f$ are each an average value obtained from at least 10 positions selected randomly.

According to the invention, the weft bending index $C_f$ is less than 0.03, preferably less than 0.01. The warp bending index $C_w$ is preferably less than 0.08, more preferably less than 0.05. In prior art leno cloths which the present inventors have examined, $C_w$ is 0.1 or more and $C_f$ is 0.08 or more in general.

To explain the tensile properties of the network article which is fixed with a resin with less curvature as specified by $C_w$ and $D_f$ according to the invention, a concept, ratio of utilization of fiber strength, F, is now introduced. First, strength at break per cross-sectional area of the fibers, A, is calculated from strength at break determined by drawing a network article specimen (25 mm in width, 150 mm in length) at a drawing speed of 20 mm/minute. A is divided by strength per cross-sectional area of the raw material fibers used to produce the network article:

$$F(\%) = A \times 100 / B$$

In a tensile test of a network article fixed with a resin, curvature (if any) of yarn in the direction of drawing does not stretch to become straight, but yarns break at bending positions. It is believed that the resin itself contributes very little to the tensile strength. accordingly, if F is 100%, this means that the intrinsic strength of the used fibers are completely utilized. As F is larger, the less amount of the reinforcing material suffices to obtain desired tensile properties in a composite made of it.

Although the ratio of utilization of strength in a network article, F, varies depending upon fibers, weaving manner and resin amount, F is about 50% when previous leno cloths with $C_w$ of 0.12, which the present inventors have examined, are used. When $C_w$ is 0.08 according to the invention, F is about 60%; $C_w$ 0.02, F 70 to 80%. Regarding the weft, when $C_f$ is 0.08 as previously, F is about 40%. When $C_f$ is 0.03 according to the invention, F is about 60%; $C_f$ 0.01, F 70 to 80%.

In the invention, the high rigidity yarns as the warp need to be of high strength, and may be selected, for instance, from carbon fibers, aramide fibers, high strength vinylon fibers and glass fibers. What is expected for the low rigidity yarns used in combination with the high rigidity yarns is merely a force to bind intersections of the cloth and high strength is not particularly needed. The yarns may be selected from a wide variety, such as carbon fibers, aramide fibers, high strength vinylon fibers, glass fibers, acrylic fibers, polyamide fibers and polyester fibers. The high rigidity yarns and the low rigidity yarns may be of the same material as long as they have different cross-sectional areas, for instance, due to different filament numbers or filament diameters so that they have different rigidities as a whole yarn.

The weft yarns and non-low-rigidity warp yarns in the network article of the invention may be selected, for instance, from carbon fiber, aramide fibers, high strength vinylon fibers and glass fibers, which are of high strength.

When a cement component is used in an inorganic matrix reinforced with the network article of the invention, alkali resistance is desirable for the yarns. It would be easy for those skilled in the art to choose proper fibers depending upon compositions of the inorganic matrix materials as above.

Weave density of the leno cloth is coarse in general. When cement with aggregates, for instance, is used as the inorganic matrix, openings is preferably of a size of 3 to 50 mm, more preferably 3 to 10 mm, taking it into consideration that the aggregates of 2 to 25 mm in diameter may pass through the network article.

The resin to fix the leno cloth may be applied to the cloth in any proper manner, such as dipping and spraying. The resin may be thermoplastic or curable. Thermosetting resins are preferred in the invention, such as epoxy resins, urethane resin, phenolic resins, polyimide resins, vinyl ester resins and unsaturated polyester resins. The thermoplastic resins include polyamide resins, polyester resins, polyphenylene sulfide resins, polyvinyl chloride resins and polystyrene resins. When the inorganic matrix material contains cement, preferred are those resistant to alkali for a long period of time and, further, it is preferred that those do not deteriorate in strength during curing in an autoclave at about 180° C. for 5 hours.

One method of lowering the weft bending index and, preferably, the warp bending index, too, below the aforesaid values is to use higher rigidity yarns and lower rigidity yarns in combination in a leno cloth used as a reinforcing material. That is, the warp consists of at least two kinds of yarns having different rigidities, and at least one one kind of yarn having the highest rigidity among the above yarns is made present substantially on one side of the woven structure. In FIGS. 1(a) and 1(b) illustrating the warp consisting of two kinds of yarns, a set of warp yarns 1 and 2 consists of yarn 1 with higher rigidity and yarn 2 with lower rigidity, and high rigidity yarn 1 does not wreathe substantially, but lower rigidity yarn 2 wreathes with yarn 1. Accordingly, high rigidity yarn 1 is almost straight and exists substantially on one side of the woven structure. meanwhile weft yarn 3 is given almost no force to bend it from warp yarns 1 and 2 and is almost straight as well, as shown in FIG. 3(b). In such configuration of yarns, the strength in the weft direction can be improved without sacrificing the strength in the warp direction, because almost no force occurs to bend the high rigidity yarn 1 when tension is applied in the weft direction. The invention should not be limited to the above embodiment where two kinds of yarns are used as the warp and one kind of yarn is used as the weft. For instance, it is possible to use two or more low rigidity yarns to wreathe. Alternatively, two or more high rigidity yarns may be used, and each of them may be wreathed with a low rigidity yarn. Two or more weft yarns may be used.

Another method of preparing a network article with a weft bending index less than 0.03 comprises the following steps: a leno cloth is impregnated with a resin; and then the resin is solidified while tension is applied in the direction of the weft of the cloth, wherein said tension is so strong that a weft bending index, $C_f$ as defined above is less than 0.03. A case where a curable resin is used will be explained first below. Usual curable resins may be cured while tension is applied, whereby a leno cloth is fixed with the resin. A means of applying tension includes curving rubber rollers, rotating sliding rollers, scrolls and tenters. Tenters are most suitable because a cloth is not brought into contact on its whole surface. The resin is in a so-called A or B stage before the curing. The curing of a resin here is conducted to keep the configuration of the cloth and, therefore, the resin must be made at least non-flowable. Complete curing is not always needed, and a B stage close to a C stage would be allowed. It is, however, preferred to proceed with the curing as far as possible for stability of a product. A means of curing is not particularly limited and may be any known one. To explain the stages of curing, the terms "A stage", "B stage" and "C stage" are not strictly defined, but rather qualitative. The terms "A stage" indicate that almost no cross-linking reaction has occurred yet and each molecule is not bound and is in free motion. In a B stage, partial cross-linking is found, but a degree of freedom of motion for each molecule is large and, upon heated, fluidity is seen. In a C stage, cross-linking has occurred to a substantial extent and no fluidity is found when heated. In the present invention, the C stage is defined as a condition where a resin shows no spinnability when heated on a hot plate at any temperatures, as described in the Japanese Industrial Standard C 6487, test method of curing time for thermosetting resins.

When use is mode of a curable resin which shows lower flowability even before curing among many curable resins, it is possible to carry out an alternative manner where tension is applied in the weft direction after or while such a resin applied to a leno cloth is softened, and the resin is then cured under tension. If tension is applied to a cloth without softening the resin, the weft would not become more straight, so that the envisaged value of $C_f$ is not attained. Accordingly, the resin must be once softened by heating. The heating temperature is equal to or higher than a softening point of the resin, but not so high as to cause the resin to deteriorate.

Alternatively, when use is made of a curable resin which can easily be deformed by heat even after cured, such a resin may be applied to a leno cloth, cured and then heated to or above the softening point of the resin, after or during which heating tension is applied in the weft direction. Then, the resin is cooled below the softening point and the tension is released. In this manner, the curing of a resin may be carried out in a continuous process starting with the impregnation of a resin. The curing is conducted until a C stage is attained. However, an early C stage is preferred where the curing is less completed, that is to say, the softening point is lower, in order to make the softening easier. A means of applying the tension may be the same as mentioned above. It is preferred to heat the resin to a temperature 50° C. higher than the softening point for easier change of the shape of the resin. If the tension is released before the resin is cooled below the softening point, a force will occur to recover the shape which the resin had before given the tension due to the three-dimentionally cross-linked structure of the resin and, accordingly, it will be very difficult to attain a weft bending index less than 0.03. Curing will further progress during the heating to or above the softening point, which may raise the softening point. Accordingly, it is sufficient to cool the resin below this new softening point in the cooling step before the tension is released.

When a thermoplastic resin is used, a prepreg with an impregnated resin is heated to or above the softening point of the resin, after or during which step tension is applied in the weft direction of the cloth to lessen the curvature of the weft and then the resin is cooled to solidify. A means of applying the tension may be the same as mentioned for the cases of curable resins.

In the invention, the softening point of a resin is a temperature at which the degree of motion of the resin molecules increases suddenly and is qualitatively the same as a glass transition temperature. Examples of methods to determine it are determination of a point of inflection in DSC, determination of a point of inflection in elastic modulus by a viscoelasticity measuring unit, determination of a point of inflection in thermal expansion coefficient by a thermomechanical analyser (TMA) and determination of a softening point by a TMA. All of these will give values close to each other. In the invention, the determination of a softening point by a TMA was adopted. That is, a softening point is determined as follows; a piece (corresponding to one yarn fixed with a resin) of a network article is cut out and placed in a TMA so as to measure deflection in the direction of thickness. The load is 20 g; the heating speed is 5° C./minutes; and deflection with the rising temperature is recorded. In the temperature-deflection curve, abrupt decrease in the thickness is observed at a certain temperature. The intersection of extended lines from the straight parts before and after the inflection point is referred to as a softening point.

In the above process for the preparation of the network article accordingly to the invention, it is essential to apply tension to a leno cloth in the weft direction, but it is not excluded to apply tension in the warp direction, too.

The above process may be applied to a leno cloth in which the warp and weft are composed of the same yarns as well as a leno cloth in which the warp differs from the weft. The process may also be applied with significant advantage to a leno cloth in which the warp consists of at least two kinds of yarns having different rigidities as described above.

In the above process, a tenter may be preferably used. However, where a large amount of an uncured curable resin is applied to a whole leno cloth and then cured while its selvages are held in a predetermined width by clips or pins of a tenter, the cured resin sometime sticks to the clips or pins in the curing process, which may cause the leno cloth to break or even the clips or pins, chains and rails to damage.

When a curable resin is applied by coating as an alternative method, it is possible to prevent the resin from being applied to the selvages of a leno cloth using a knife coater with the length shorter than the width of the leno cloth. However, the yarns of the cloth often slip out of place at the position of the knife coater and at the plate position opposite the knife coater.

As a countermeasure, it is thought to coat clips or pins of a tenter with a releasing agent. However, a releasing agent is gradually removed in operation and the aforesaid problem will occur again. If the clips or pins are processed with a fluororesin, their coefficient of friction becomes so small that it is impossible to strongly claw a leno cloth in the lateral direction. If a silicone resin is used, a soft resin film is easily broken in operation.

The present inventors have now found that the above problem may be solved by a method comprising curing a curable resin while tentering a leno cloth impregnated with the resin, characterized in that before holding the selvages of the leno cloth, the resin in the parts to be held is cured in advance. To attain this, a means of curing is be applied only to the parts to be held. For instance, shielding plates may be placed between the parts to be held and the remaining part (i.e., central part) of the leno cloth, and infrared rays, far infrared rays or ultraviolet rays are applied to the parts to be held. Alternatively, hot plates are applied only to the parts to be held. These means are, however, not restrictive. It is sufficient to conduct the curing of a resins in the parts to be held to such an extent that stickiness is lost. Thus, curing to a so-called C stage is sufficient, but complete curing may not cause any problem. The width of the parts to be held varies depending upon an apparatus used, and is generally in a range of from about 0.5 to about 3 cm.

After curing the resin in the parts to be held in advance, the leno cloth is held and its central part or the whole is subjected to a curing means. To this end, a conventional tenter with a heating furnace may be used, and the aforesaid curing of the resin in the parts to be held is preferably carried out before the leno cloth is transferred to a tenter.

The above method may be used not only for a leno cloth, but also for other woven fabrics, knitted fabrics, nonwoven fabrics, paper or any others in a sheet form. The method may be effectively applied to fabrics having no selvage structure or to nonwoven fabrics or paper in which a bonding force among fibers is weak. Even in a case where yarns or fibers in the selvages are made entangled or broken in a prior art method, a tentering process with a tenter can be conducted by strengthening the parts to be held in advance according to the above method.

In the fiber-reinforced shaped inorganic article according to the invention. The inorganic hardening material as a matrix includes a binder such as usual cement, e.g. Portland cement, alumina cement and Portland blastfurnace cement, crushed calcium silicate comprising lime and silicate, gypsum such as hemihydrate gypsum and anhydrous gypsum, and granulated slag type water-hardening materials such as blast furnace slag, and mixtures of crushed water-granulated slag with gypsum, and further, if needed, natural or man-made aggregates, for instance, with a diameter of 2 to 25 mm, builders and admixtures. These are kneaded with water and then used as a matrix in the preparation of the product. Plastics usually used in FRP may be the matrix, too.

To prepare the fiber-reinforced shaped inorganic article, the network article obtained as described above is arranged in the parts of a structure which receive tensile stress, and a matrix material is cast and hardened to yield a fiber-reinforced structure. Strength, elastic modulus, number of filaments and the like of high rigidity fiber may be decided depending upon strength needed for an envisaged product, and then the type of the fiber is selected. Preferred examples of the structure comprising the network article according to the invention are ones in the form of plate in which one or more network articles are embedded near the surface.

By the use of the network article of the invention, strength and rigidity of a fiber-reinforced structure are improved, or the amount of the fiber in the network article used as a reinforcing material may be reduced.

The invention will further be described in the following Examples. The descriptions "parts" and "percentage" for amounts hereinafter are based on weight.

EXAMPLES 1 TO 4 AND COMPARISON EXAMPLES 1 AND 2

In a set of warp yarns, there were used carbon fiber bundles (3,000 or 6,000 filaments, hereinafter 3 k or 6 k fil; monofilament diameter 7 microns; tensile strength 460 Kgf/mm$^2$) as a high rigidity fiber, and aramide fiber Kevlar 29 (trade mark, Du Pont, 400 deniers) as a low rigidity yarn. As the weft, the same carbon fiber bundles (6 k fil) as mentioned above were used.

A leno cloth having a structure shown in FIGS. 1(a) and 1(b) was prepared with a weave density of 3.3 per 25 mm both in the warp and the weft using the carbon fiber bundles (6 k fil) and Kevlar 29 as the warp.

For comparison, a pair of the carbon fiber bundles (3 k fil) were used as the warp to prepare a leno cloth with a weave density of 3.3/25 mm.

The cloths were impregnated with an epoxy resin solution of the following composition, and dried and cured at 150° C. for 15 minutes. The amount of the resin was 41% based on the weight of the cured network article.

| | |
|---|---|
| Bisphenol A type epoxy resin (GY-260, Ciba-Geigy) | 100 parts |
| Dicyandiamide | 10 parts |
| Imidazol type accelerator (Curezol 2P4MHZ, Shikoku Kasei) | 2 parts |
| Solvent (methyl cellosolve) | 120 parts |

The impregnation with the resin was conducted in two manners: manual dipping or dipping with a pregreg machine. For tension. two manners were also tried: application of tension to the cloth during the drying and curing, or no tension applied.

The bending indices and the ratios of utilization of fiber strengths of the network articles thus obtained are summarized in Table 1, where $F_w$ and $F_f$ represent a ratio of utilization of strength in the warp or weft direction, respectively.

TABLE 1

| | Impregnation Manner | Tension | Warp Direction | | Weft Direction | |
|---|---|---|---|---|---|---|
| | | | $C_w$ | $F_w$ | $C_f$ | $F_f$ |
| Ex. 1 | Manual | Free | 0.04 | 68% | 0.03 | 62% |
| Ex. 2 | Manual | Warp & Weft | 0.02 | 75% | <0.01 | 78% |
| Comp. 1 | Manual | Free | 0.15 | 42% | 0.05 | 55% |
| Comp. 2 | By Machine | Warp | 0.09 | 57% | 0.10 | 39% |
| Ex. 3 | Manual | Free | 0.04 | 69% | 0.03 | 64% |
| Ex. 4 | Manual | Warp & Weft | 0.02 | 75% | <0.01 | 79% |

In Example 1, the leno cloth according to the invention was used in which the balance between the rigidities of the two warp yarns was proper. Accordingly, both $C_w$ and $C_f$ were small and both F for the warp and F for the weft exceeded 60% even with no tension applied. Example 2 was conducted as in Example 1 except that tension was applied during the curing, in which F for the warp and F for the weft were near 80%.

In Comparison Example 1, the prior art leno cloth was impregnated with the resin which was then cured with no tension, where $C_w$ and $C_f$ were large and Fs were small. Comparison Example 2 was conducted as in Comparison Example 1 except that the step of the impregnation and curing of the resin was conducted using a prepreg machine where strong tension was applied in the warp direction. Although $C_w$ decreased and $F_w$ rised, $F_f$ decreased significantly due to the increased $C_f$. That is, the balance between the warp and the weft was very bad.

As the amount of Kevlar 29 was small compared to that of the carbon fiber, contribution of Kevlar 29 to the strength of the warp was small. However, in order to remove its effect, Kevlar 29 was cut in advance before the tensile test in Table 1. Therefore, it may be concluded that where the same high rigidity fiber is used, tensile strength and rigidity of raw material fiber are more effectively exhibited in a shaped article reinforced with a network article of the invention than with a prior art one.

Further, Examples 1 and 2 were repeated except that Technola 240 (trade mark, Teijin Co., 400 deniers) was used instead of Kevlar 29. The results are shown in Table 1 as Examples 3 and 4, respectively.

COMPARISON EXAMPLE 3

Using a pair of carbon fiber bundles (3,000 filaments; monofilament diameter 7 microns; tensile strength 460 Kgf/mm$^2$) as the warp and similar carbon fiber bundles (6,000 filaments), there was prepared a leno cloth having structure shown in FIGS. 2(a) and 2(b) and a weave density of 3.3 per 25 mm both in the warp and the weft.

A resin solution of the following composition was prepared for impregnation.

| | |
|---|---|
| Bisphenol A type epoxy resin (GY-260, Chiba-Geigy) | 100 parts |
| Dicyandiamide | 10 parts |
| Imidazol type accelerator (Curezol 2P4MHZ, Shikoku Kasei) | 2 parts |
| Solvent (methyl cellosolve) | 120 parts |

The cloth was impregnated with the resin in the amount of 41 wt. % based on the shaped product, and dried and cured at 150° C. for 15 minutes, using a prepreg machine.

COMPARISON EXAMPLE 4

A cloth was impregnated with a resin as in Comparison Example 3 and, then, dried and rolled as a prepreg of a B stage, which was then cured at 160° C. for 8 minutes under tension in the weft direction applied by a clip tenter. The tension was however, weak and $C_f$ was 0.04.

EXAMPLE 5

Comparison Example 4 was repeated except that tension was made strong so that $C_f$ was 0.01. The results are as shown in Table 2.

TABLE 2

|  | $C_f$ | $F_f$ | $F_w$ |
|---|---|---|---|
| Comp. 3 | 0.10 | 39% | 57% |
| Comp. 4 | 0.04 | 52% | 56% |
| Example 5 | 0.01 | 63% | 56% |

EXAMPLE 6

In a set of warp yarns, there were used carbon fiber bundles (6,000 filaments; monofilament diameter 7 microns; tensile strength 460 Kgf/mm$^2$) as a high rigidity fiber, and aramide fiber Kevlar 29 (trade mark, Du Pont, 400 deniers) as a low rigidity yarn. As the weft, the same carbon fiber bundles (6 k fil) as mentioned above were used.

A leno cloth having structure shown in FIGS. 1(a) and 1(b) was prepared with a weave density of 3.3 per 25 mm both in the warp and the weft.

As in Example 5, impregnation with a resin was conducted to prepare a prepreg, which was then cured under tension applied in the weft direction. The results are as follows:

| $C_f$ | $F_f$ | $F_w$ |
|---|---|---|
| 0.005 | 79% | 78% |

When Technola 240 (400 deniers) was used instead of Kevlar 29, $C_f$ and $F_f$ were the same as those mentioned above and $F_w$ was 77%.

COMPARISON EXAMPLE 5

Comparison Example 3 was repeated with the same leno cloth with the exception that the amount of the imidazol type accelerator was 1 part in the resin solution. The cloth was impregnated with the resin in the amount of 41 wt. % based on the shaped product, and dried and cured at 150° C. for 5 minutes using a prepreg machine.

EXAMPLE 7

A leno cloth was impregnated with the resin, and dried and cured at 150° C. for 5 minutes as in Comparison Example 5. The softening point of the resin at this stage was 53° C. This leno cloth was held on a simple frame tenter which could apply tension in the warp and weft directions, which was then placed in an oven at 180° C. for one minute until the resin was sufficiently softened. Then, tension was applied in the direction of the weft of the cloth, which was then immediately taken out of the oven and cooled to room temperature. The network article was removed from the frame of the simple tenter. $C_f$ of this network article was 0.02.

EXAMPLE 8

Example 7 was repeated with the same leno cloth as used in Example 6. $C_f$ of the network article obtained was 0.01.

COMPARISON EXAMPLE 7

Example 8 was repeated with the exception that immediately after the cloth was taken out of the oven, the tension was released, followed by cooling to room temperature. Because the tension was released at a temperature above the softening point, the network article obtained recovered the original curvature of the yarns and $C_f$ was 0.07.

The results of Examples 7 and 8 and Comparison Example 6 and 7 are summarized in Table 3.

TABLE 3

|  | $C_f$ | $F_f$ |
|---|---|---|
| Comp. 6 | 0.10 | 39% |
| Comp. 7 | 0.07 | 44% |
| Example 7 | 0.02 | 69% |
| Example 8 | 0.01 | 75% |

COMPARISON EXAMPLE 8

The same leno cloth as used in Comparison Example 3 was used. A resin solution of the following composition was prepared for impregnation:

| Cresolnovolak type epoxy resin (ECN 1280, Ciba-Geigy) | 100 parts |
|---|---|
| Dicyandiamide | 10 parts |
| Solvent (methyl cellosolve) | 120 parts |

The cloth was impregnated with the resin in the amount of 41 wt. % based on the shaped product, and dried at 150° C. for 5 minutes. The resin was at a B stage, but solid at room temperature. The cloth was rolled as a prepreg and then given tension in the weft direction by a clip tenter so strongly that the cloth slipped over the clips. Then, the clips were fixed, followed by curing at 160° C. for 15 minutes.

Although the tension was made as strong as possible, the curvature of the weft remained substantially after the curing, because the prepreg was at room temperature during the drawing and the resin was, accordingly, solid.

EXAMPLE 9

A prepreg was prepared as in Comparison Example 8. This was given tension in the weft direction by a clip tenter, after a hot wind of 150° C. was blowing against the prepreg for 1 minute to sufficiently soften the resin. Then, the clips were fixed, followed by curing at 160° C. for 15 minutes. The weft bending index of the network article obtained was very small.

EXAMPLE 10

The same leno cloth as used in Example 6 was subjected to impregnation of resin, drying, heat softening and curing in the same conditions as in Example 9.

The results of Comparison Example 8 and Examples 9 and 10 are summarized below:

TABLE 4

| | $C_f$ | $F_f$ |
|---|---|---|
| Comp. 8 | 0.07 | 44% |
| Example 9 | 0.02 | 69% |
| Example 10 | 0.01 | 75% |

EXAMPLE 11

In a set of warp yarns, there were used carbon fiber bundles (each 6,000 or 12,000 filaments, hereinafter 6k or 12k fil; monofilament diameter 7 microns; tensile strength 460 Kgf/mm$^2$) as a high rigidity fiber, and aramide fiber Kevlar 29 (trade mark, Du Pont, 400 deniers) as a low rigidity yarn. As the weft, the same carbon fiber bundles (12k fil) as mentioned above were used. A leno cloth having structure shown in FIGS. 1(a) and 1(b) was prepared with a weave density of 3.3 per 25 mm both in the warp and the weft. The cloth was impregnated with an epoxy resin solution of the following composition, and dried and cured at 150° C. for 15 minutes. The amount of the resin was 41% based on the weight of the cured network article. The bending indices and the ratios of utilization of strength of the network article obtained are summarized in Table 5.

| | |
|---|---|
| Bisphenol A type epoxy resin (GY-260, Ciba-Geigy) | 100 parts |
| Dicyandiamide | 10 parts |
| Imidazol type accelerator (Curezol 2P4MHZ, Shikoku Kasei) | 2 parts |
| Solvent (methyl cellosolve) | 120 parts |

TABLE 5

| | Yarn Construction | Bending Index | Ratio of Utilization |
|---|---|---|---|
| Warp | Carbon Fiber (12k fil) 1 yarn Kevlar 29 (400 deniers) 1 yarn | $C_w = 0.04$ | $F_w = 68\%$ |
| Weft | Carbon Fiber (12k fil) 1 yarn | $C_f = 0.02$ | $F_f = 65\%$ |

The network article obtained was cut into pieces of 40 mm by 160 mm so that 4 sets of the warp yarns or 4 weft yarns were contained in a piece. Each piece was arranged in a mold form so that the piece faced the lower surface of the mold form. A matrix paste was prepared by weighting and kneading the following matrix materials and casted into the mold form to obtain test pieces (40 mm×160 mm×6 mm) for a bending test. The obtained shaped products were cured in water at 20° C. for 14 days.

Matrix Composition:

| | |
|---|---|
| Normal Portland cement | 100 parts |
| No. 8 silica sand | 50 parts |
| Water | 50 parts |

A test for strength was conducted in a manner where the 4 sets of the warp yarns or the 4 weft yarns in a test piece were placed in the drawing direction. A four-point bending test was adopted at a loading speed of 0.5 mm/minute with a distance of 40 mm between the fulcrums.

For comparison, a network article was prepared as in the above using prior art yarn construction as shown in Table 6. Similar bending test pieces were prepared and subjected to the test for strength.

TABLE 6

| | Yarn Construction | Bending Index | Ratio of Utilization |
|---|---|---|---|
| Warp | Carbon Fiber (6k fil) 2 yarn | $C_w = 0.09$ | 57% |
| Weft | Carbon Fiber (12k fil) 1 yarn | $C_f = 0.06$ | 58% |

Figure 4:
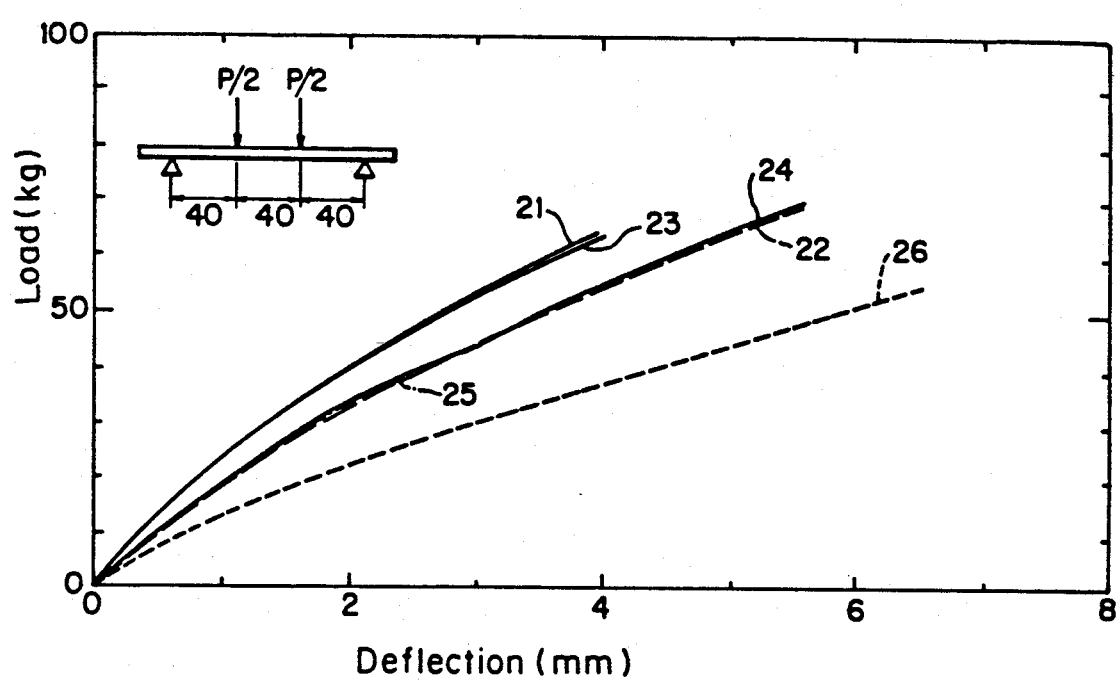
FIG. 4 shows load-strain curves in bending tests of inorganic plates reinforced with various network articles.

The load-deflection curves obtained in the test for strength are as shown in FIG. 4, where the four curves 21, 22, 25 and 26 correspond to the following:
21: Bent to draw the warp of the leno cloth according to the invention,
22: Bent to draw the weft of the leno cloth according to the invention,
25: Bent to draw the warp of the leno cloth of the prior art, and
26: Bent to draw the weft of the leno cloth of the prior art.

The maximum loads at break in FIG. 4 are as shown in Table 7.

TABLE 7

| Reinforcing Material | No. in FIG. 4 | Max. Load (kg) |
|---|---|---|
| Warp direction in the invention | 21 | 60.01 |
| Warp direction in the invention | 22 | 68.91 |
| Warp direction in the prior art | 25 | 44.03 |
| Warp direction in the prior art | 26 | 52.81 |
| Warp direction in the invention | 23 | 59.80 |
| Warp direction in the invention | 24 | 69.22 |

As seen from Table 7, a shaped product reinforced with a network article of the invention is superior in bending strength and bending rigidity both in the warp direction (21) and the weft direction (22) to a shaped product reinforced with a prior art leno cloth (25 and 26).

Here, Kevlar 29 was cut in advance in the test as mentioned in Example 1.

In another example, Technola 240 (400 deniers) was used instead of Kevlar 29 to repeat the above. The amount of the resin was 40% and the properties of the network article obtained were the same as those in Table 5 except that $F_w$ was 67%. The properties of the reinforced inorganic product are also as shown in Table 7.

What is claimed is:

1. A process for the preparation of a network article comprising a leno cloth fixed with a resin, comprising the steps of:
   impregnating the leno cloth with a resin capable of being solidified; and,
   solidifying said resin while applying tension in the direction of the weft of the cloth, said tension being so strong that a weft bending index, $C_f$, as defined below is less than 0.03:

$$C_f = D_f/L_f$$

wherein $L_f$ is an average distance between two mutually-adjacent warp yarns, and
   $D_f$ is an average distance between one peak of a wavy central line of a weft yarn and a straight line connecting two peaks adjacent to said peak in a cross section along the weft of the network article.

2. The process according to claim 1, wherein said leno cloth is impregnated with a curable resin and comprising the further step of curing the resin present in selvage portions of said cloth prior to the step of solidifying;

said tension being applied by tentering said cloth while holding said selvage portions of said cloth.

3. The process according to claim 1, wherein the warp of the network article consists of at least two kinds of yarns having different rigidities and at least one kind of yarn having the highest rigidity out of said yarns has a warp bending index, $C_w$, of less than 0.08 as defined below:

$$C_w = D_w/L_w$$

wherein $L_w$ is an average distance between two mutually-adjacent weft yarns, and $D_w$ is an average distance between one peak of a wavy central line of the warp yarn and a straight line connecting two peaks adjacent to said peak in a surface view of the network article.

4. The process according to claim 1, wherein the warp consists of at least two kinds of yarns having different rigidities, and at least one kind of yarn having the highest rigidity out of said yarns has so little curvature that it exists substantially on one side of the weave structure.

5. The process according to claims 1, 3 or 4, wherein $C_f$ is less than 0.01.

6. The process according to claim 3 wherein $C_w$ is less than 0.05.

7. The process according to claims 3 or 4 wherein said highest rigidity yarn is selected from the group consisting of carbon fibers, aramide fibers, vinylon fibers and glass fibers, and a yarn of said warp having the lowest rigidity is selected from the group consisting of carbon fibers, aramide fibers, vinylon fibers, glass fibers, acrylic fibers, polyamide fibers and polyester fibers.

8. The process according to claims 1, 3 or 4, wherein the resin is selected from the group consisting of epoxy resins, urethane resins, phenolic resins, polyimide resins, vinyl ester resins and unsaturated polyester resins.

* * * * *